United States Patent
Shoji et al.

(10) Patent No.: US 9,772,491 B2
(45) Date of Patent: Sep. 26, 2017

(54) IMAGE FORMING APPARATUS, OPTICAL SCANNING DEVICE, MAINTENANCE METHOD

(71) Applicant: KYOCERA Document Solutions Inc., Osaka-shi, Osaka (JP)

(72) Inventors: Haruki Shoji, Osaka (JP); Okito Ogasahara, Osaka (JP); Naohiro Anan, Osaka (JP)

(73) Assignee: KYOCERA Document Solutions Inc., Osaka-shi, Osaka (JP)

(*) Notice: Subject to any disclaimer, the term of this patent is extended or adjusted under 35 U.S.C. 154(b) by 0 days.

(21) Appl. No.: 15/166,077

(22) Filed: May 26, 2016

(65) Prior Publication Data
US 2016/0349659 A1  Dec. 1, 2016

(30) Foreign Application Priority Data
May 29, 2015 (JP) ................. 2015-110676

(51) Int. Cl.
| | | |
|---|---|---|
| *G03G 15/043* | (2006.01) | |
| *G02B 26/12* | (2006.01) | |
| *G03G 15/04* | (2006.01) | |
| *G03G 15/00* | (2006.01) | |
| G03G 21/20 | (2006.01) | |

(52) U.S. Cl.
CPC ....... *G02B 26/127* (2013.01); *G03G 15/0409* (2013.01); *G03G 15/55* (2013.01); *G03G 21/20* (2013.01)

(58) Field of Classification Search
CPC .. G03G 15/0409; G03G 15/55; G03G 15/553; G03G 21/20; G02B 26/127
USPC .................................. 399/4, 43, 44, 51
See application file for complete search history.

(56) References Cited

U.S. PATENT DOCUMENTS

| | | | | |
|---|---|---|---|---|
| 5,617,339 A | * | 4/1997 | Smith | G11B 19/28 |
| | | | | 369/53.43 |
| 2006/0033804 A1 | * | 2/2006 | Dan | G03G 15/0409 |
| | | | | 347/230 |
| 2009/0028603 A1 | * | 1/2009 | Yoo | G03G 15/0409 |
| | | | | 399/151 |
| 2011/0243590 A1 | * | 10/2011 | Ito | G03G 15/0409 |
| | | | | 399/51 |

FOREIGN PATENT DOCUMENTS

JP  2010124925 A  6/2010

\* cited by examiner

*Primary Examiner* — Sophia S Chen
(74) *Attorney, Agent, or Firm* — Alleman Hall Ceasman & Tuttle LLP

(57) ABSTRACT

An image forming apparatus includes a rotating polygon mirror, a motor, a bearing portion, a measurement processing portion, and a determination processing portion. The rotating polygon mirror causes a light beam emitted from the light source to be scanned. The motor rotates the rotating polygon mirror. The bearing portion rotatably supports a rotation shaft of the motor via a lubricant. The measurement processing portion measures a transition time that is a time required for the motor to transition from a stationary state to a driving state in which the motor rotates at a predetermined speed. The determination processing portion determines whether or not a maintenance is required, based on the transition time measured by the measurement processing portion.

12 Claims, 8 Drawing Sheets

IMAGE FORMING APPARATUS, OPTICAL SCANNING DEVICE, MAINTENANCE METHOD

INCORPORATION BY REFERENCE

This application is based upon and claims the benefit of priority from the corresponding Japanese Patent Application No. 2015-110676 filed on May 29, 2015, the entire contents of which are incorporated herein by reference.

BACKGROUND

The present disclosure relates to an image forming apparatus, an optical scanning device mounted in an image forming apparatus, and a maintenance method.

In an image forming apparatus such as a printer for forming an image by the electrophotography, a light beam emitted from a light source is scanned over an image carrying member such as a photoconductor drum by a rotating polygon mirror. In this type of image forming apparatus, a rotation shaft of a motor for rotating the rotating polygon mirror may be supported by a bearing to which a lubricant such as grease or oil has been applied. In addition, there is known a configuration for detecting the load of the motor based on an electric current that flows through the motor.

SUMMARY

An image forming apparatus according to an aspect of the present disclosure includes a light source, a rotating polygon mirror, a motor, a bearing portion, a measurement processing portion, and a determination processing portion. The rotating polygon mirror is configured to cause a light beam emitted from the light source to be scanned. The motor is configured to rotate the rotating polygon mirror. The bearing portion is configured to rotatably support a rotation shaft of the motor via a lubricant. The measurement processing portion is configured to measure a transition time that is a time required for the motor to transition from a stationary state to a driving state in which the motor rotates at a predetermined speed. The determination processing portion is configured to determine whether or not a maintenance is required, based on the transition time measured by the measurement processing portion.

An optical scanning device according to another aspect of the present disclosure includes a light source, a rotating polygon mirror, a motor, a bearing portion, a measurement processing portion, and a determination processing portion. The rotating polygon mirror is configured to cause a light beam emitted from the light source to be scanned. The motor is configured to rotate the rotating polygon mirror. The bearing portion is configured to rotatably support a rotation shaft of the motor via a lubricant. The measurement processing portion is configured to measure a transition time that is a time required for the motor to transition from a stationary state to a driving state in which the motor rotates at a predetermined speed. The determination processing portion is configured to determine whether or not a maintenance is required, based on the transition time measured by the measurement processing portion.

A maintenance method according to a further aspect of the present disclosure is executed in an image forming apparatus that includes a light source, a rotating polygon mirror configured to cause a light beam emitted from the light source to be scanned, a motor configured to rotate the rotating polygon mirror, and a bearing portion configured to rotatably support a rotation shaft of the motor via a lubricant. The maintenance method includes a first step and a second step. In the first step, a transition time that is a time required for the motor to transition from a stationary state to a driving state in which the motor rotates at a predetermined speed, is measured. In the second step, it is determined whether or not a maintenance is required, based on the transition time measured in the first step.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes embodiments of the present disclosure with reference to the attached drawings. It should be noted that the following embodiments are an example of specific embodiments of the present disclosure and should not limit the technical scope of the present disclosure.

First Embodiment

First, an outlined configuration of an image forming apparatus 10 according to a first embodiment of the present disclosure is described with reference to FIG. 1 and FIG. 2. Here, FIG. 1 is a schematic cross-sectional view showing the configuration of the image forming apparatus 10.

Figure 1:
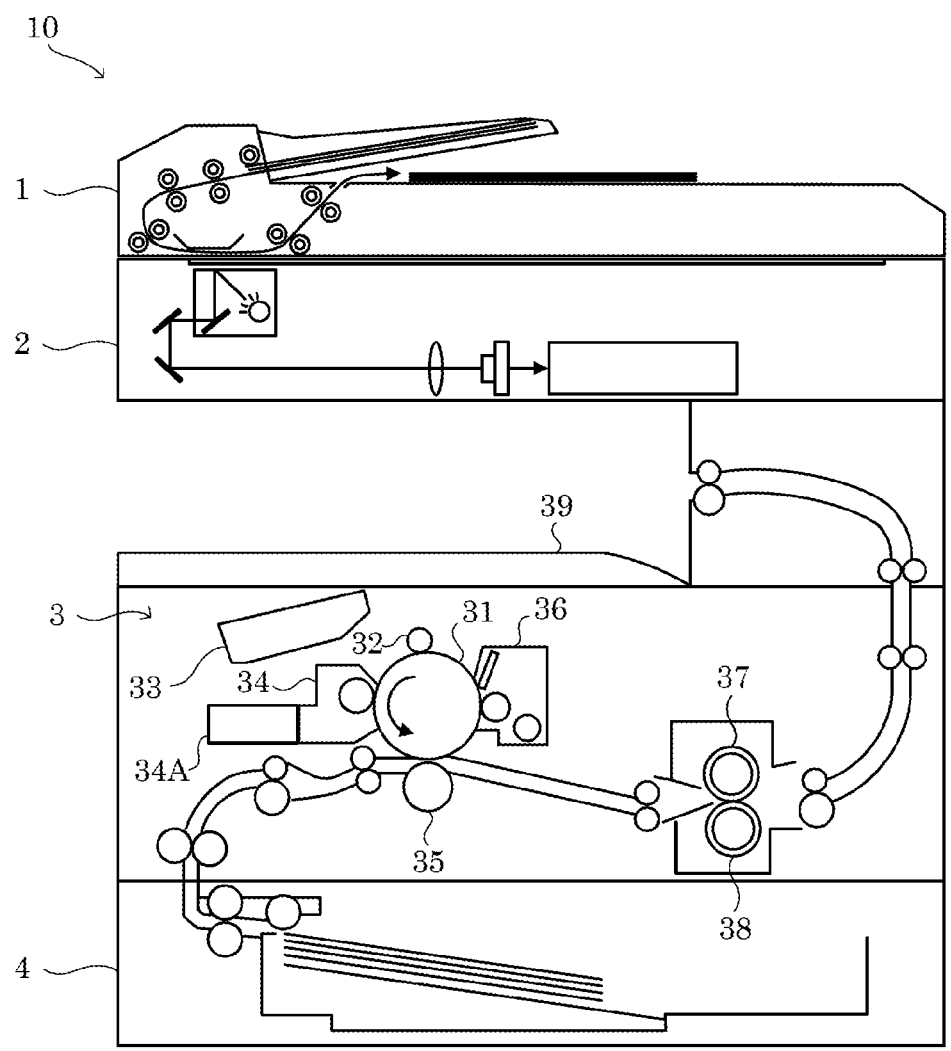
FIG. 1 is a diagram showing the configuration of an image forming apparatus according to a first embodiment of the present disclosure.
Figure 2:
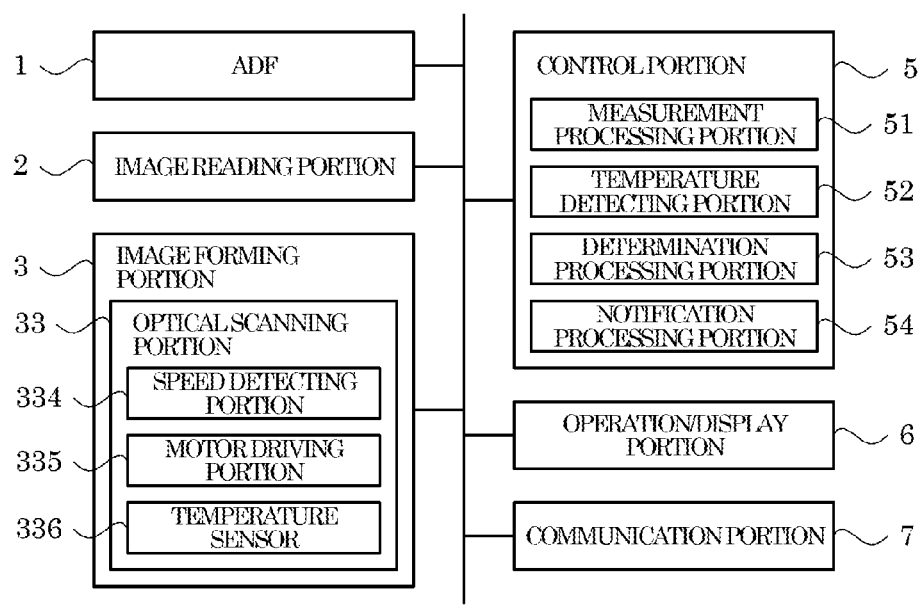
FIG. 2 is a block diagram showing the system configuration of the image forming apparatus according to the first embodiment of the present disclosure.

As shown in FIG. 1 and FIG. 2, the image forming apparatus 10 includes an ADF 1, an image reading portion 2, an image forming portion 3, a sheet feed portion 4, a control portion 5, an operation/display portion 6, and a communication portion 7. The image forming apparatus 10 is a multifunction peripheral having a plurality of functions such as a scan function for reading image data from a document sheet, a print function for forming an image based on the image data, a facsimile function, or a copy function. In addition, the present disclosure is applicable to an image forming apparatus such as a printer device, a facsimile device, or a copier.

The ADF 1 includes a document sheet setting portion, a plurality of conveyance rollers, a document sheet pressing, and a sheet discharge portion, and is an automatic document feeder for feeding a document sheet to be read by the image reading portion 2. The image reading portion 2 includes a document sheet table, a light source, a plurality of mirrors, an optical lens, and a CCD (Charge Coupled Device), and is configured to read image data from a document sheet.

The control portion 5 includes control equipment such as CPU, ROM, RAM, and EEPROM that are not shown. The CPU is a processor that executes various calculation processes. The ROM is a nonvolatile storage portion in which various information such as control programs for causing the CPU to execute various processes are stored in advance. The RAM is a volatile storage portion, and is used as a temporary storage memory (working area) for the various processes executed by the CPU. The EEPROM is a nonvolatile storage portion. In the control portion 5, the CPU executes the various control programs stored in advance in the ROM. This allows the image forming apparatus 10 to be controlled comprehensively by the control portion 5. It is noted that the control portion 5 may be formed as an electronic circuit such as an integrated circuit (ASIC), and may be a control portion provided independently of a main control portion that comprehensively controls the image forming apparatus 10.

The operation/display portion 6 includes a display portion and an operation portion. The display portion is, for example, a liquid crystal display and displays various types of information based on control instructions from the control portion 5. The operation portion is composed of, for example, operation keys or a touch panel through which various types of information are input to the control portion 5 based on user operations.

The communication portion 7 is a communication interface that can perform a wired or wireless data communication with an external communication apparatus.

The image forming portion 3 is configured to execute an image forming process (print process) of forming an image by the electrophotography based on image data read by the image reading portion 2 or image data input from an external information processing apparatus such as a personal computer.

Specifically, as shown in FIG. 1, the image forming portion 3 includes a photoconductor drum 31, a charger 32, an optical scanning portion 33, a developing device 34, a transfer roller 35, a cleaning device 36, a fixing roller 37, a pressure roller 38, and a sheet discharge tray 39. In the image forming portion 3, an image is formed in the procedure provided below, on a sheet supplied from a sheet feed cassette attached to the sheet feed portion 4 in a detachable manner, and the sheet with the image formed thereon is discharged to the sheet discharge tray 39. It is noted that the sheet is a sheet-like material such as a sheet of paper, a sheet of coated paper, a postcard, an envelope, or an OHP sheet.

First, the charger 32 charges the surface of the photoconductor drum 31 uniformly into a certain potential. Next, the optical scanning portion 33 irradiates light on the surface of the photoconductor drum 31 based on the image data. This results in an electrostatic latent image formed on the surface of the photoconductor drum 31. The developing device 34 then develops (visualizes) the electrostatic latent image on the photoconductor drum 31 as a toner image. It is noted that toner (developer) is supplied from a toner container 34A attached to the image forming portion 3 in a detachable manner.

Subsequently, the toner image formed on the photoconductor drum 31 is transferred to a sheet by the transfer roller 35. The sheet is then passed through between the fixing roller 37 and the pressure roller 38 while heated by the fixing roller 37. This allows the toner image transferred to the sheet to be fused and fixed to the sheet. It is noted that the toner that has remained on the surface of the photoconductor drum 31 is removed by the cleaning device 36.

Figure 3:
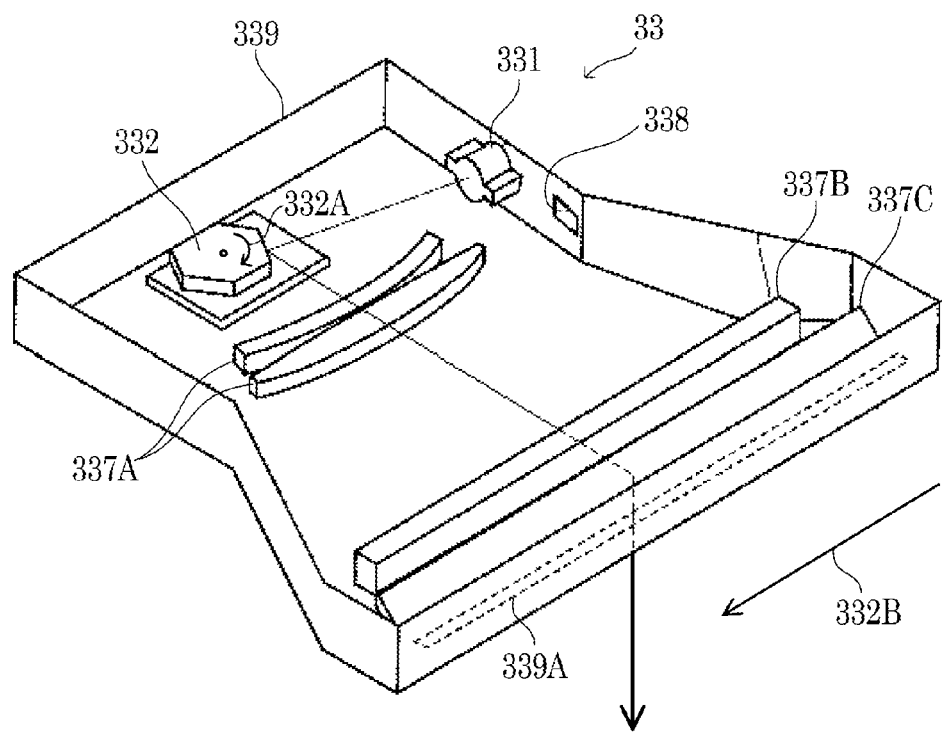
FIG. 3 is a diagram showing the configuration of an optical scanning portion of the image forming apparatus according to the first embodiment of the present disclosure.
Figure 4:
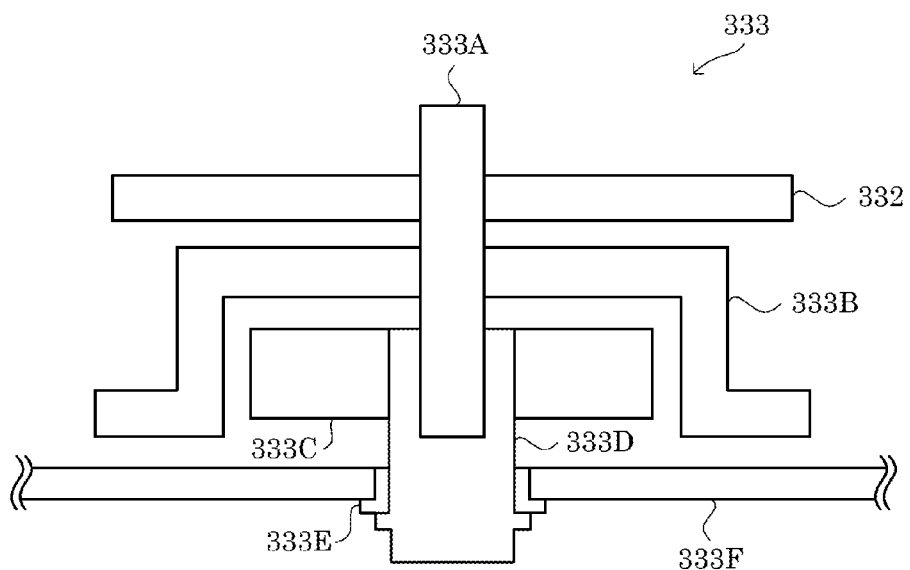
FIG. 4 is a diagram showing the configuration of a motor of the image forming apparatus according to the first embodiment of the present disclosure.

Here, the optical scanning portion 33 is described with reference to FIG. 2 to FIG. 4. FIG. 3 is a perspective view showing the configuration of the optical scanning portion 33. FIG. 4 is a schematic cross-sectional diagram showing the configuration of a motor 333.

The optical scanning portion 33 forms, on the photoconductor drum 31, an electrostatic latent image corresponding to the image data by scanning the photoconductor drum 31 with light corresponding to the image data. Specifically, as shown in FIG. 2 to FIG. 4, the optical scanning portion 33 includes a light source 331, a polygon mirror 332, a motor 333, a speed detecting portion 334, a motor driving portion 335, a temperature sensor 336, an fθ lens 337A, a condenser lens 337B, a total reflection mirror 337C, a beam detector 338, a housing 339 storing these components, and a slit 339A formed in the housing 339. It is noted that, in the image forming portion 3, the optical scanning portion 33 is disposed above the photoconductor drum 31 such that the longitudinal direction of the slit 339A and the axis direction of the photoconductor drum 31 are parallel to each other.

The light source 331 is a semiconductor laser light source that emits laser beams in correspondence with the image data. The light source 331 emit a light beam. The polygon mirror 332 is configured to rotate at a high speed along a rotation direction 332A shown in FIG. 3, and causes the light emitted from the light source 331 to scan. As one example, the polygon mirror 332 is in the shape of a regular hexagon in a plan view, and has a plurality of reflection surfaces formed along the rotation direction 332A. The laser beams emitted from the light source 331 are reflected by the reflection surfaces of the rotating polygon mirror 332, and the reflected beams are scanned along a main scanning direction 332B shown in FIG. 3. Here, the polygon mirror 332 is an example of the rotating polygon mirror of the present disclosure.

The motor 333 causes the polygon mirror 332 to rotate. For example, in the image forming apparatus 10, a brushless motor is used as the motor 333. Specifically, as shown in FIG. 4, the motor 333 includes a rotation shaft 333A, a rotor 333B, a stator 333C, and a bearing portion 333D. The motor 333 is attached to a substrate 333F by fixing the bearing portion 333D to the substrate 333F via a fixing member 333E.

The rotation shaft 333A is a drive shaft of the motor 333. To the rotation shaft 333A, the polygon mirror 332 and the rotor 333B that includes a permanent magnet are fixed. The bearing portion 333D is a fluid dynamic bearing that rotatably supports the rotation shaft 333A via a lubricant such as grease or oil. The stator 333C includes an electromagnet that is excited by a driving voltage applied by the motor driving portion 335, and is fixed to the bearing portion 333D.

In the motor 333, the rotor 333B rotates around the rotation shaft 333A through the interaction of the rotor 333B and the stator 333C. This allows the polygon mirror 332 to rotate around the rotation shaft 333A. It is noted that the rotor 333B may include an electromagnet and the stator 333C may include a permanent magnet.

The speed detecting portion 334 detects a rotation speed of the motor 333. For example, the speed detecting portion 334 is a rotary encoder attached to the rotation shaft 333A of the motor 333. The speed detecting portion 334 outputs, to the motor driving portion 335 or the control portion 5, an electric signal having a frequency corresponding to the rotation speed of the motor 333.

The motor driving portion 335 is a driving circuit that drives the motor 333 by applying a driving voltage to the motor 333. Specifically, the motor driving portion 335 rotates the motor 333 at a constant speed based on the control signal input from the control portion 5. For example, the motor driving portion 335 controls the rotation speed of the motor 333 by controlling the driving voltage based on the electric signal output from the speed detecting portion 334. In addition, upon determining, based on the electric signal output from the speed detecting portion 334, that the rotation speed of the motor 333 has reached a speed specified by the control portion 5, the motor driving portion 335 notifies the control portion 5 of the fact. Here, the motor driving portion 335 is an example of the voltage applying portion of the present disclosure.

The temperature sensor 336 is a sensor configured to detect the temperature of the bearing portion 333D. As one example, the temperature sensor 336 is a thermistor that outputs an electric signal corresponding to the temperature of the bearing portion 333D. The electric signal output from the temperature sensor 336 is input to the control portion 5.

The fθ lens 337A and the condenser lens 337B convert laser beams reflected by the polygon mirror 332 into parallel light beams. The total reflection mirror 337C reflects laser beams that have passed through the condenser lens 337B, toward the surface of the photoconductor drum 31. The slit 339A is a light outgoing port that guides the laser beams reflected by the total reflection mirror 337C to the surface of the photoconductor drum 31. This allows the laser beams emitted from the light source 331 to be scanned over the surface of the photoconductor drum 31 along the main scanning direction 332B, and an electrostatic latent image corresponding to the image data is formed on the photoconductor drum 31.

The beam detector 338 detects laser beams at a position that is on the upstream side in the main scanning direction 332B and outside a scanning region through which laser beams to be reflected by the total reflection mirror 337C pass. The beam detector 338 is, for example, an optical sensor including a light receiving portion, and outputs an electric signal (BD signal) corresponding to an irradiated amount of laser beam. The BD signal output from the beam detector 338 is input to the control portion 5 and is used to determine a timing at which the optical scanning portion 33 starts scanning the surface of the photoconductor drum 31 with laser beams along the main scanning direction 332B.

Meanwhile, in the image forming apparatus 10, the remaining amount of the lubricant applied to the bearing portion 333D may be decreased. When the remaining amount of the lubricant applied to the bearing portion 333D becomes insufficient, the load of the motor 333 becomes large. With regard to this problem, the following measures may be considered. That is, the load of the motor 333 may be detected based on the current that flows in the motor 333, and it may be determined, based on the detection result, whether or not a maintenance is required, whereas the maintenance is, for example, to replenish the lubricant. In that case, however, a configuration for detecting the current is required. On the other hand, as described below, the image forming apparatus 10 can determine, with a simple configuration, whether or not a maintenance is required.

Specifically, a first determination program is stored in advance in the ROM of the control portion 5, wherein the first determination program causes the CPU to execute a first obtainment process (see the flowchart of FIG. 5) and a first determination process (see the flowchart of FIG. 6) that are described below. It is noted that the first determination program may be recorded on a non-transitory computer-readable recording medium such as a CD, a DVD, or a flash memory, and may be installed from the recording medium to a storage portion such as the EEPROM of the control portion 5.

As shown in FIG. 2, the control portion 5 includes a measurement processing portion 51, a temperature detecting portion 52, a determination processing portion 53, and a notification processing portion 54. Specifically, the control portion 5 executes, with use of the CPU, the first determination program stored in the ROM. This allows the control portion 5 to function as the measurement processing portion 51, the temperature detecting portion 52, the determination processing portion 53, and the notification processing portion 54. Here, a device including the optical scanning portion 33 and the control portion 5 is an example of the optical scanning device of the present disclosure.

The measurement processing portion 51 measures a transition time that is a time required for the motor 333 to transition from a stationary state to a driving state in which the motor 333 rotates at a predetermined speed. Specifically, the measurement processing portion 51 measures the transition time at a first timing and a second timing, wherein the second timing is later than the first timing. Hereinafter, a transition time measured at the first timing is referred to as a first transition time; and a transition time measured at the second timing is referred to as a second transition time.

An example of the first timing is when the image forming apparatus 10 is initialized, or when an execution operation for the first obtainment process is performed on the operation/display portion 6, wherein the first obtainment process is described below. The execution operation is performed, for example, by a person in charge of production, a person in charge of the maintenance work, or a user when the image forming apparatus 10 is shipped or when a maintenance of the optical scanning portion 33 is performed. The second timing is, for example, each time the image forming apparatus 10 is powered on, or each time the apparatus is returned from a sleep state during which predetermined functions are stopped, during use by the user after the shipment of the image forming apparatus 10 or after the maintenance of the optical scanning portion 33.

As one example, the measurement processing portion 51 inputs a control signal to the motor driving portion 335 so as to cause the motor driving portion 335 to rotate the motor 333 at the predetermined speed. The measurement processing portion 51 obtains the first transition time or the second transition time by measuring the time that has elapsed from the time when the control signal was input to the motor driving portion 335, to the time when the notification that the rotation speed of the motor 333 has reached the predetermined speed is sent from the motor driving portion 335. It is noted that the measurement processing portion 51 may determine whether or not the rotation speed of the motor 333 has reached the predetermined speed, based on the electric signal input from the speed detecting portion 334 instead of the motor driving portion 335.

The measurement processing portion 51 causes the motor driving portion 335 to apply a constant voltage having a predetermined voltage value that corresponds to the predetermined speed, to the motor 333 so as to rotate the motor 333. With this configuration, compared to the feedback control in which the motor driving portion 335 adjusts the driving voltage based on the results of a comparison between the predetermined speed and the rotation speed of the motor 333 indicated by the electric signal input from the speed detecting portion 334, it is possible to reflect, more prominently on the transition time, an increase of the load of the motor 333 caused by a decrease of the lubricant. It is noted that the control of the driving voltage by the motor driving portion 335 may be different from the above-described one.

In addition, the predetermined speed is higher than a rotation speed during image formation of the motor 333. With this configuration, compared to a configuration for measuring a time required for the motor 333 to transition from the stationary state to a driving state in which the motor 333 rotates at the rotation speed during image formation, each of the first transition time and the second transition time is longer than the time measured in that configuration. It is thus possible to reflect, more prominently on the transition time, an increase of the load of the motor 333 caused by the decrease of the lubricant.

The temperature detecting portion 52 detects the temperature of the bearing portion 333D. As one example, the temperature detecting portion 52 detects the temperature of the bearing portion 333D before the measurement processing portion 51 measures the transition time at the first timing and the second timing. Specifically, the temperature detecting portion 52 detects the temperature of the bearing portion 333D based on the electric signal output from the temperature sensor 336.

The determination processing portion 53 determines whether or not a maintenance is required, based on the transition time measured by the measurement processing portion 51.

Specifically, the determination processing portion 53 determines whether or not a maintenance is required, based on a difference between the first transition time and the second transition time. For example, when the difference between the first transition time and the second transition time exceeds a threshold that is obtained by multiplying the first transition time by a preset permissible increasing rate, the determination processing portion 53 determines that a maintenance is required. The permissible increasing rate is set to, for example, 50 percent.

Meanwhile, the higher the temperature of the bearing portion 333D is, the lower the viscosity of the lubricant applied to the bearing portion 333D is. When the viscosity of the lubricant becomes low, the load of the motor 333 decreases. As a result, in the image forming apparatus 10, the temperature of the bearing portion 333D is taken into account as a material for determining whether or not a maintenance is required.

That is, the determination processing portion 53 determines whether or not a maintenance is required based on the transition time measured by the measurement processing portion 51 and the temperature of the bearing portion 333D detected by the temperature detecting portion 52. As one example, the EEPROM of the control portion 5 stores in advance table data associating each difference between temperatures of the bearing portion 333D at the first timing and the second timing, with a correction coefficient for correcting the second transition time. The determination processing portion 53 obtains a correction coefficient from the table data based on the temperatures of the bearing portion 333D detected by the temperature detecting portion 52 at the first timing and at the second timing. The determination processing portion 53 then determines that a maintenance is required, when a difference between the first transition time and a value obtained by multiplying the second transition time by the correction coefficient exceeds the threshold.

It is noted that the determination processing portion 53 may determine whether or not a maintenance is required based on only the second transition time. For example, when the second transition time exceeds a preset upper limit time, the determination processing portion 53 may determine that a maintenance is required. The upper limit time is set, for example, based on an average value of a plurality of measured values of the first transition time measured by motors 333 mounted in a plurality of image forming apparatuses 10. In addition, the determination processing portion 53 may determine that a maintenance is required, when the second transition time corrected in accordance with the temperature of the bearing portion 333D detected at the second timing exceeds the predetermined upper limit time.

The notification processing portion 54, when the determination processing portion 53 determines that a maintenance is required, notifies of the fact. The notification processing portion 54 notifies that a maintenance is required by displaying a message on the operation/display portion 6, the message stating that the lubricant needs to be replenished so as to be applied to the bearing portion 333D, or the optical scanning portion 33 needs to be replaced.

It is noted that the notification processing portion 54 may transmit an electronic mail including the message to a predetermined destination such as a person in charge of the maintenance work of the image forming apparatus 10, in place of or together with displaying the message on the operation/display portion 6. In addition, the electronic mail may include measurement history information that indicates the first transition time and measured values of the second transition time measured at each second timing.

[First Obtainment Process]

Figure 5:
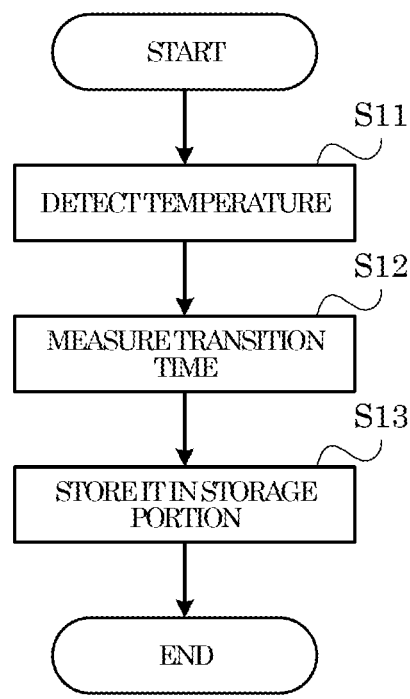
FIG. 5 is a flowchart showing an example of a first obtainment process executed by the image forming apparatus according to the first embodiment of the present disclosure.

In the following, with reference to FIG. 5, a description is given of an example of the procedure of the first obtainment process executed by the control portion 5 in the image forming apparatus 10. Here, steps S11, S12, . . . represent numbers assigned to the processing procedures (steps) executed by the control portion 5. It is noted that the first obtainment process is executed when the first timing comes.

<Step S11>

First, in step S11, the control portion 5 detects the temperature of the bearing portion 333D. Specifically, the control portion 5 detects the temperature of the bearing portion 333D based on the electric signal output from the temperature sensor 336. Here, the process of step S11 is executed by the temperature detecting portion 52 of the control portion 5.

<Step S12>

In step S12, the control portion 5 measures the transition time (the first transition time). Specifically, the control portion 5 inputs a control signal to the motor driving portion 335 so as to cause the motor driving portion 335 to rotate the motor 333 at the predetermined speed. The control portion 5 then obtains the transition time by measuring the time that has elapsed from the time when the control signal was input to the motor driving portion 335, to the time when the notification that the rotation speed of the motor 333 has reached the predetermined speed is sent. Here, the process of step S12 is executed by the measurement processing portion 51 of the control portion 5.

<Step S13>

In step S13, the control portion 5 stores, in a storage portion such as the EEPROM, the temperature of the bearing portion 333D detected in step S11 and the transition time measured in step S12.

[First Determination Process]

Figure 6:
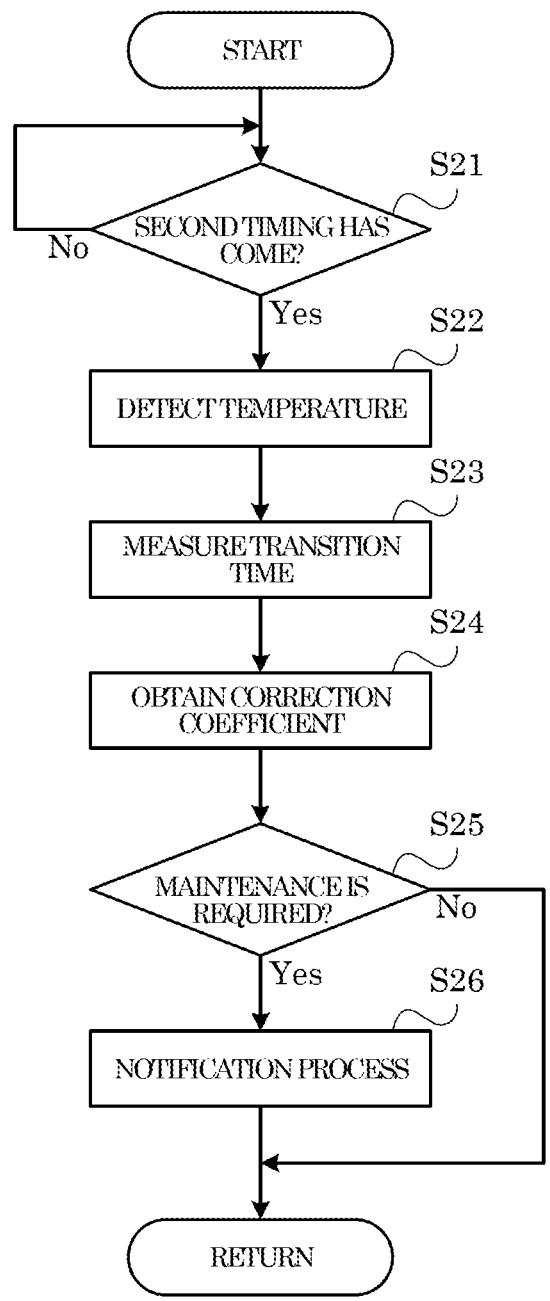
FIG. 6 is a flowchart showing an example of a first determination process executed by the image forming apparatus according to the first embodiment of the present disclosure.

Next, with reference to FIG. 6, a description is given of an example of the procedure of the first determination process executed by the control portion 5 in the image forming apparatus 10, and the maintenance method of the present disclosure. It is noted that the first determination process is executed after the first obtainment process is executed.

<Step S21>

First, in step S21, the control portion 5 determines whether or not the second timing has come.

Upon determining that the second timing has come (Yes side at S21), the control portion 5 moves the process to step S22. On the other hand, upon determining that the second timing has not come (No side at S21), the control portion 5 waits at step S21 for the second timing to come.

<Step S22>

In step S22, as in step S11 of the first obtainment process, the control portion 5 detects the temperature of the bearing portion 333D. Here, the process of step S22 is executed by the temperature detecting portion 52 of the control portion 5.

<Step S23>

In step S23, as in step S12 of the first obtainment process, the control portion 5 measures the transition time (the second transition time). Here, the process of step S23 is an example of the first step of the present disclosure, and is executed by the measurement processing portion 51 of the control portion 5.

<Step S24>

In step S24, the control portion 5 obtains a correction coefficient that corresponds to a temperature difference between the temperature of the bearing portion 333D obtained in the first obtainment process and the temperature of the bearing portion 333D obtained in step S22. Specifically, the control portion 5 refers to the table data stored in the EEPROM, and obtains a correction coefficient that corresponds to the temperature difference.

<Step S25>

In step S25, the control portion 5 determines, based on the transition time measured in step S23, whether or not a maintenance is required. Here, the process of step S25 is an example of the second step of the present disclosure, and is executed by the determination processing portion 53 of the control portion 5.

Specifically, the control portion 5 determines that a maintenance is required, when a difference between: the first transition time obtained in the first obtainment process; and a value obtained by multiplying the second transition time measured in step S23 by the correction coefficient obtained in step S24, exceeds the threshold that is obtained by multiplying the first transition time by the permissible increasing rate.

Upon determining that a maintenance is required (Yes side at S25), the control portion 5 moves the process to step S26. On the other hand, upon determining that a maintenance is not required (No side at S25), the control portion 5 moves the process to step S21.

<Step S26>

In step S26, the control portion 5 notifies that a maintenance is required. Here, the process of step S26 is executed by the notification processing portion 54 of the control portion 5.

The control portion 5 notifies that a maintenance is required, for example, by displaying, on the operation/display portion 6, a message that the lubricant needs to be replenished so as to be applied to the bearing portion 333D or a message that the optical scanning portion 33 needs to be replaced. This makes it possible for the user to make a contact with a person in charge of the maintenance work or the like and have a maintenance service for the optical scanning portion 33.

In addition, the control portion 5 may transmit an electronic mail including the message to a predetermined destination such as a person in charge of the maintenance work or the like, in place of or together with displaying the message on the operation/display portion 6. This reduces the trouble of the user to make a contact with the person in charge of the maintenance work or the like.

As described above, in the first determination process, the transition time, namely, a time required for the motor 333 to transition from the stationary state to a driving state in which the motor 333 rotates at the predetermined speed, is measured, and it is determined, based on the measured transition time, whether or not a maintenance is required. This configuration makes it possible to determine, with a simple configuration, whether or not a maintenance is required.

In addition, in the image forming apparatus 10, the first obtainment process is executed and the first transition time is obtained before the first determination process is executed. In the first determination process, it is determined, based on a difference between the first transition time and the second transition time, whether or not a maintenance is required. Compared to a configuration where it is determined whether or not a maintenance is required, based on a comparison result between the upper limit time and the second transition time, this makes it possible to perform a determination in correspondence with a variation in property of each of the motor 333. This accordingly improves the accuracy of determining whether or not a maintenance is required.

Second Embodiment

In the following, a second embodiment of the present disclosure is described. In the second embodiment, the configuration of the control portion 5 of the image forming apparatus 10 has been partially changed from that in the first embodiment. Specifically, in the image forming apparatus 10 according to the second embodiment, the measurement processing portion 51 of the control portion 5 differs in configuration from that in the first embodiment. It is noted that the rest of the configuration is shared by the second embodiment and the first embodiment.

More specifically, in the image forming apparatus 10 of the second embodiment, the measurement processing portion 51 measures a transition time that is a time required for the motor 333 to transition from a driving state in which the motor 333 rotates at a predetermined first speed, to a driving state in which the motor 333 rotates at a second speed that is lower than the first speed. The measurement processing portion 51 measures the transition time at a third timing and a fourth timing, wherein the fourth timing is later than the third timing. Hereinafter, a transition time measured at the third timing is referred to as a third transition time; and a transition time measured at the fourth timing is referred to as a fourth transition time.

An example of the third timing is when the image forming apparatus 10 is initialized, or when an execution operation of the second obtainment process, which is described below, is performed on the operation/display portion 6. The execution operation is performed, for example, by a person in charge of production, a person in charge of the maintenance work, or a user when the image forming apparatus 10 is shipped or when a maintenance of the optical scanning portion 33 is performed. An example of the fourth timing is, for example, when an execution of a predetermined number of print processes is completed.

Here, the first speed is the same as the rotation speed during image formation of the motor 333. This makes it possible to measure the fourth transition time by using a rotation state of the motor 333 immediately after the execution of the print processes. It is noted that the first speed may be the same as the predetermined speed.

As one example, the measurement processing portion 51, at the third timing, inputs a control signal to the motor driving portion 335 so as to cause the motor driving portion 335 to rotate the motor 333 at the first speed. The measurement processing portion 51 then inputs a control signal to the motor driving portion 335 so as to cause the motor driving portion 335 to change the rotation speed of the motor 333 to the second speed. The measurement processing portion 51 then obtains the third transition time by measuring the time that has elapsed from the time when the control signal instructing to change the rotation speed was input to the motor driving portion 335, to the time when the notification that the rotation speed of the motor 333 has reached the second speed is sent. It is noted that the measurement processing portion 51 may determine whether or not the rotation speed of the motor 333 has reached the second speed, based on the electric signal input from the speed detecting portion 334 instead of the motor driving portion 335.

On the other hand, the measurement processing portion 51, at the fourth timing, inputs a control signal to the motor driving portion 335 so as to cause the motor driving portion 335 to change the rotation speed of the motor 333 to the second speed. The measurement processing portion 51 then obtains the fourth transition time by measuring the time that has elapsed from the time when the control signal instructing to change the rotation speed was input to the motor driving portion 335, to the time when the notification that the rotation speed of the motor 333 has reached the second speed is sent from the motor driving portion 335.

It is noted that the measurement processing portion 51 causes the motor driving portion 335 to change the rotation speed of the motor 333 by causing the motor driving portion 335 to stop applying the driving voltage to the motor 333. With this configuration, compared to the feedback control in which the motor driving portion 335 adjusts the driving voltage based on a result of a comparison between the second speed and a rotation speed of the motor 333 indicated by the electric signal input from the speed detecting portion 334, it is possible to reflect, more prominently on the transition time, an increase of the load of the motor 333 caused by the decrease of the lubricant. It is noted that the control of the driving voltage by the motor driving portion 335 may be different from the above-described one.

[Second Obtainment Process]

Figure 7:
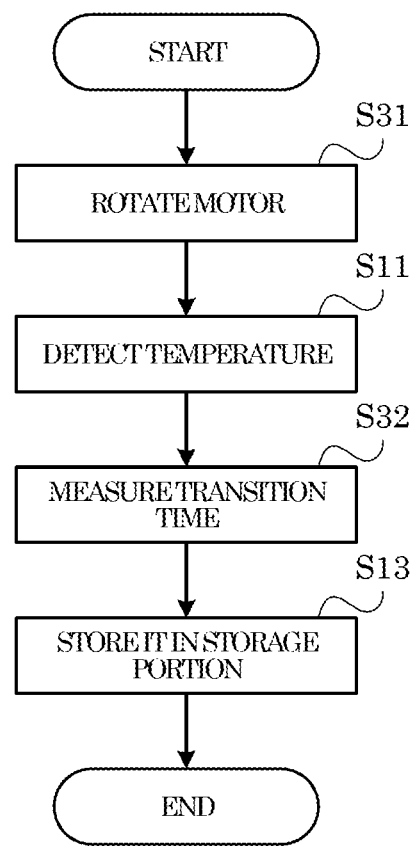
FIG. 7 is a flowchart showing an example of a second obtainment process executed by an image forming apparatus according to a second embodiment of the present disclosure.

In the following, with reference to FIG. 7, a description is given of an example of the procedure of the second obtainment process executed by the control portion 5 in the image forming apparatus 10 according to the second embodiment. The second obtainment process is executed when the third timing comes. It is noted that, in the second obtainment process, the processes that are the same as those of the first obtainment process are assigned the same reference signs, and description thereof is omitted.

<Step S31>

First, in step S31, the control portion 5 inputs a control signal to the motor driving portion 335 and causes the motor driving portion 335 to rotate the motor 333 at the first speed. Here, the process of step S31 is executed by the measurement processing portion 51 of the control portion 5.

<Step S32>

In step S32, the control portion 5 measures the transition time (the third transition time). Specifically, the control portion 5 inputs a control signal to the motor driving portion 335 and causes the motor driving portion 335 to change the rotation speed of the motor 333 to the second speed. The control portion 5 then obtains the transition time by measuring the time that has elapsed from the time when the control signal instructing to change the rotation speed was input to the motor driving portion 335, to the time when the notification that the rotation speed of the motor 333 has reached the second speed is sent from the motor driving portion 335. Here, the process of step S32 is executed by the measurement processing portion 51 of the control portion 5.

[Second Determination Process]

Figure 8:
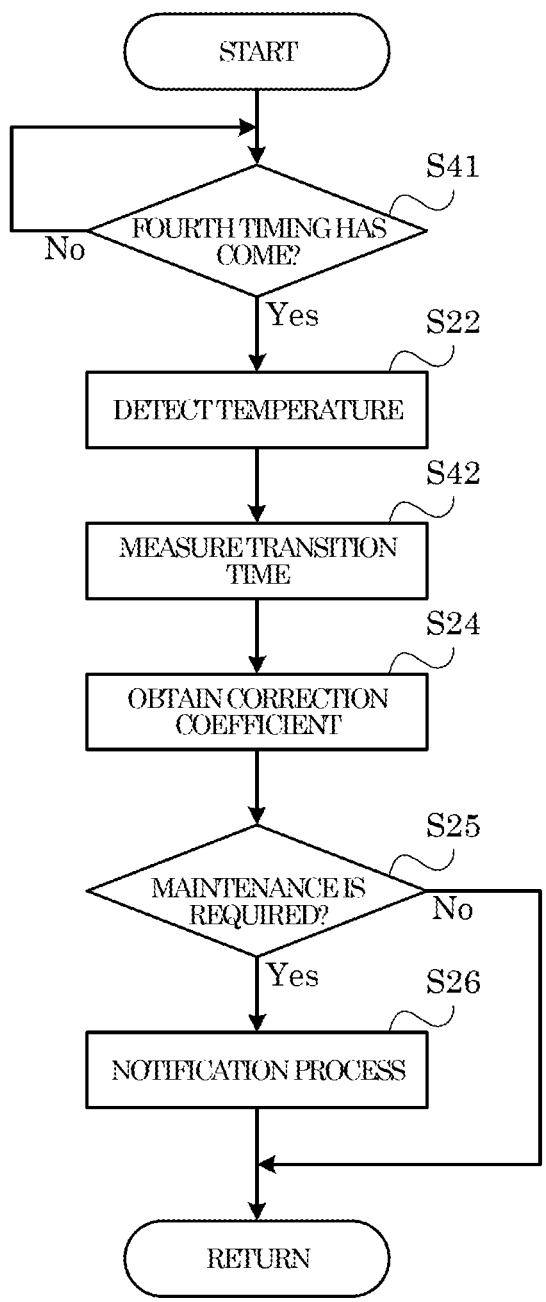
FIG. 8 is a flowchart showing an example of a second determination process executed by the image forming apparatus according to the second embodiment of the present disclosure.

Next, with reference to FIG. 8, a description is given of an example of the procedure of the second determination process executed by the control portion 5 in the image forming apparatus 10 according to the second embodiment, and the maintenance method of the present disclosure. It is noted that the second determination process is executed after the second obtainment process is executed. It is noted that, in the second determination process, the processes that are the same as those of the first determination process are assigned the same reference signs, and description thereof is omitted.

<Step S41>

First, in step S41, the control portion 5 determines whether or not the fourth timing has come.

Upon determining that the fourth timing has come (Yes side at S41), the control portion 5 moves the process to step S22. On the other hand, upon determining that the fourth timing has not come (No side at S41), the control portion 5 waits at step S41 for the fourth timing to come.

<Step S42>

In step S42, as in step S32 of the second obtainment process, the control portion 5 measures the transition time (the fourth transition time). Here, the process of step S42 is executed by the measurement processing portion 51 of the control portion 5.

As described above, in the second determination process, the transition time that is a time required for the motor 333 to transition from a driving state in which the motor 333 rotates at the first speed to a driving state in which the motor 333 rotates at the second speed, is measured, and it is determined, based on the measured transition time, whether or not a maintenance is required. Accordingly, as is the case with the image forming apparatus 10 according to the first embodiment, it is possible to determine, with a simple configuration, whether or not a maintenance is required.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
   a light source;
   a rotating polygon mirror configured to cause a light beam emitted from the light source to be scanned;
   a motor configured to rotate the rotating polygon mirror;
   a bearing portion configured to rotatably support a rotation shaft of the motor via a lubricant;
   a measurement processing portion configured to measure a transition time that is a time required for the motor to transition from a stationary state to a driving state in which the motor rotates at a predetermined speed;
   a determination processing portion configured to determine whether or not a maintenance is required, based on the transition time measured by the measurement processing portion; and
   a temperature detecting portion configured to detect a temperature of the bearing portion, wherein
   the determination processing portion determines whether or not a maintenance is required, based on the transition time measured by the measurement processing portion and the temperature of the bearing portion detected by the temperature detecting portion.

2. The image forming apparatus according to claim 1, further comprising
   a notification processing portion configured to, when the determination processing portion determines that a maintenance is required, notify thereof.

3. The image forming apparatus according to claim 1, further comprising:
   a voltage applying portion configured to apply a driving voltage to the motor, wherein
   the measurement processing portion measures the transition time by causing the voltage applying portion to apply a constant voltage to the motor.

4. The image forming apparatus according to claim 1, wherein
   the motor is a brushless motor.

5. An image forming apparatus comprising:
   a light source;
   a rotating polygon mirror configured to cause a light beam emitted from the light source to be scanned;
   a motor configured to rotate the rotating polygon mirror;
   a bearing portion configured to rotatably support a rotation shaft of the motor via a lubricant;
   a measurement processing portion configured to measure a transition time that is a time required for the motor to transition from a stationary state to a driving state in which the motor rotates at a predetermined speed; and
   a determination processing portion configured to determine whether or not a maintenance is required, based on the transition time measured by the measurement processing portion, wherein
   the measurement processing portion measures the transition time at a predetermined first timing and at a second timing that is later than the first timing, and
   the determination processing portion determines whether or not a maintenance is required, based on a difference between a transition time measured at the first timing and a transition time measured at the second timing.

6. The image forming apparatus according to claim 5, further comprising
   a notification processing portion configured to, when the determination processing portion determines that a maintenance is required, notify thereof.

7. The image forming apparatus according to claim 5, further comprising:
   a voltage applying portion configured to apply a driving voltage to the motor, wherein
   the measurement processing portion measures the transition time by causing the voltage applying portion to apply a constant voltage to the motor.

8. The image forming apparatus according to claim 5, wherein
   the motor is a brushless motor.

9. An image forming apparatus comprising:
   a light source;
   a rotating polygon mirror configured to cause a light beam emitted from the light source to be scanned;
   a motor configured to rotate the rotating polygon mirror;
   a bearing portion configured to rotatably support a rotation shaft of the motor via a lubricant;
   a measurement processing portion configured to measure a transition time that is a time required for the motor to transition from a stationary state to a driving state in which the motor rotates at a predetermined speed; and
   a determination processing portion configured to determine whether or not a maintenance is required, based on the transition time measured by the measurement processing portion, wherein
   the predetermined speed is higher than a rotation speed of the motor during an image formation.

10. The image forming apparatus according to claim 9, further comprising
    a notification processing portion configured to, when the determination processing portion determines that a maintenance is required, notify thereof.

11. The image forming apparatus according to claim 9, further comprising:
    a voltage applying portion configured to apply a driving voltage to the motor, wherein
    the measurement processing portion measures the transition time by causing the voltage applying portion to apply a constant voltage to the motor.

12. The image forming apparatus according to claim 9, wherein
    the motor is a brushless motor.

* * * * *